United States Patent
Lin et al.

(10) Patent No.: US 10,698,797 B2
(45) Date of Patent: Jun. 30, 2020

(54) MOBILE APPLICATION PROGRAM TESTING METHOD, SERVER, TERMINAL, AND STORAGE MEDIUM

(71) Applicant: TENCENT TECHNOLOGY (SHENZHEN) COMPANY LIMITED, Shenzhen (CN)

(72) Inventors: Chao Lin, Shenzhen (CN); Jisheng Huang, Shenzhen (CN); Yuyang Peng, Shenzhen (CN); Shunhang You, Shenzhen (CN); Haojun Hu, Shenzhen (CN); Hao Hu, Shenzhen (CN); Qingjie Lin, Shenzhen (CN); Zhe Cheng, Shenzhen (CN); Yi Duan, Shenzhen (CN); Yifu Wang, Shenzhen (CN); Zongzhuo Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/196,778

(22) Filed: Nov. 20, 2018

(65) Prior Publication Data

US 2019/0087310 A1 Mar. 21, 2019

Related U.S. Application Data

(63) Continuation of application No. PCT/CN2017/103395, filed on Sep. 26, 2017.

(30) Foreign Application Priority Data

Sep. 30, 2016 (CN) .......................... 2016 1 0879084

(51) Int. Cl.
*G06F 11/36* (2006.01)
*G06F 16/955* (2019.01)
(Continued)

(52) U.S. Cl.
CPC ............ *G06F 11/3672* (2013.01); *G06F 8/41* (2013.01); *G06F 8/61* (2013.01); *G06F 11/3664* (2013.01);
(Continued)

(58) Field of Classification Search
CPC .... G06F 8/61; G06F 11/3664; G06F 11/3672; G06F 16/955; G06F 8/41; G06F 11/3688;
(Continued)

(56) References Cited

U.S. PATENT DOCUMENTS 8,239,840 B1 * 8/2012 Czymontek ............... G06F 8/34
717/125
8,352,903 B1 * 1/2013 Friedman ................... G06F 8/30
717/100

(Continued)

FOREIGN PATENT DOCUMENTS

| CN | 103778549 A | 5/2014 |
|---|---|---|
| CN | 103914329 A | 7/2014 |

(Continued)

OTHER PUBLICATIONS

The World Intellectual Property Organization (WIPO) International Search Report for PCT/CN2017/103395 dated Dec. 22, 2017 5 Pages (including translation).

(Continued)

*Primary Examiner* — Marina Lee
(74) *Attorney, Agent, or Firm* — Anova Law Group, PLLC

(57) ABSTRACT

A mobile application program testing method is provided for a server. The method includes receiving a code-to-be-tested sent by a first terminal, compiling the code-to-be-tested to a mobile application program, and recording a downloading address used for downloading the mobile application program. The method also includes generating a barcode used (Continued)

for obtaining the downloading address; and returning the barcode to the first terminal to be displayed. A second terminal acquires the barcode, obtains the downloading address, downloads the mobile application program according to the downloading address, and tests the mobile application program on the second terminal.

16 Claims, 9 Drawing Sheets

(51) Int. Cl.
    *G06F 8/61*         (2018.01)
    *G06F 8/41*         (2018.01)
    *H04L 29/08*       (2006.01)
    *H04W 12/00*      (2009.01)
    *H04W 4/60*        (2018.01)
    *H04W 4/50*        (2018.01)

(52) U.S. Cl.
    CPC ...... *G06F 11/3688* (2013.01); *G06F 16/9554* (2019.01); *H04L 67/34* (2013.01); *H04W 4/50* (2018.02); *H04W 4/60* (2018.02); *H04W 12/0023* (2019.01); *H04W 12/00522* (2019.01)

(58) Field of Classification Search
    CPC ....... G06F 16/9554; H04W 4/50; H04W 4/60; H04W 12/0023; H04W 12/00522; H04L 67/34
    USPC .................................. 717/124–135
    See application file for complete search history.

(56) References Cited

U.S. PATENT DOCUMENTS

| | | | |
|---|---|---|---|
| 8,479,154 B1 * | 7/2013 | Friedman | G06F 8/30 717/100 |
| 9,237,465 B1 * | 1/2016 | Tanner | H04B 5/0031 |
| 10,111,263 B2 * | 10/2018 | Wang | H04L 12/6418 |
| 10,311,415 B2 * | 6/2019 | Xu | G06Q 20/14 |
| 2009/0069000 A1 * | 3/2009 | Kindberg | G06F 16/9577 455/414.3 |
| 2012/0221717 A1 | 8/2012 | Sela | |
| 2012/0254853 A1 * | 10/2012 | Aggarwal | G06F 9/44505 717/173 |
| 2013/0032634 A1 * | 2/2013 | McKirdy | G16H 40/67 235/375 |
| 2014/0110473 A1 * | 4/2014 | Zhou | G06F 16/74 235/375 |
| 2014/0237563 A1 * | 8/2014 | Zhang | H04L 63/083 726/5 |
| 2014/0298293 A1 * | 10/2014 | Nishio | G06F 8/30 717/121 |
| 2016/0117656 A1 * | 4/2016 | Xu | G06Q 20/14 705/34 |
| 2016/0316507 A1 * | 10/2016 | Wang | H04L 12/6418 |
| 2019/0087310 A1 * | 3/2019 | Lin | H04L 67/34 |
| 2019/0251533 A1 * | 8/2019 | Xu | G06Q 20/12 |

FOREIGN PATENT DOCUMENTS

| | | |
|---|---|---|
| CN | 104407980 A | 3/2015 |
| CN | 104978191 A | 10/2015 |
| CN | 105183657 A | 12/2015 |
| CN | 105607992 A | 5/2016 |
| CN | 106528404 A | 3/2017 |
| EP | 1591901 A1 | 11/2005 |
| WO | 2012063070 A1 | 5/2012 |

OTHER PUBLICATIONS

The State Intellectual Property Office of the People's Republic of China (SIPO) Office Action 1 for 201610879084.X dated Aug. 24, 2018 15 Pages (including translation).

* cited by examiner

US 10,698,797 B2

MOBILE APPLICATION PROGRAM TESTING METHOD, SERVER, TERMINAL, AND STORAGE MEDIUM

RELATED APPLICATIONS

This application is a continuation application of PCT Patent Application No. PCT/CN2017/103395, filed on Sep. 26, 2017, which claims priority to Chinese Patent Application No. 201610879084.X, filed with the Chinese Patent Office on Sep. 30, 2016 and entitled "MOBILE APPLICATION PROGRAM TESTING METHOD AND APPARATUS", which is incorporated herein by reference in its entirety.

FIELD OF TECHNOLOGY

The present disclosure relates to the field of testing technologies and, in particular, to a mobile application program testing method, a server, a terminal, and a storage medium.

BACKGROUND

Program testing is an important step in a life cycle of a computer program and is a main method to find program errors and bugs. Program testing specifically refers to testing of a computer program that completes all or part functions and modules before being officially released for use, so as to ensure that the program correctly runs in a preset manner. A mobile application program is an application program for a mobile terminal, for example, an Android mobile application program applicable to an Android operating system, or an iOS mobile application program applicable to the iOS (the mobile terminal operating system of Apple).

However, current program testing methods often have low testing efficiencies. The disclosed methods and systems are directed to solve one or more problems set forth above and other problems.

SUMMARY

To resolve the problem of low testing efficiency of a mobile application program, this application provides a mobile application program testing solution in the following.

According to one aspect of the present disclosure, a mobile application program testing method is provided for a server. The method includes receiving a code-to-be-tested sent by a first terminal, compiling the code-to-be-tested to a mobile application program, and recording a downloading address used for downloading the mobile application program. The method also includes generating a barcode used for obtaining the downloading address; and returning the barcode to the first terminal to be displayed. A second terminal acquires the barcode, obtains the downloading address, downloads the mobile application program according to the downloading address, and tests the mobile application program on the second terminal According to another aspect of the present disclosure, a mobile application program testing method is provided for a first terminal. The method includes obtaining a testing instruction, and sending a code-to-be-tested to a server according to the testing instruction, so that the server compiles the code-to-be-tested as a mobile application program and records a downloading address used for downloading the mobile application program. The method also includes receiving a barcode sent by the server and used for obtaining the downloading address, and displaying the barcode, so that a second terminal acquires the barcode, obtains the downloading address, downloads the mobile application program according to the downloading address, and tests the mobile application program on the second terminal.

According to another aspect of the present disclosure, a mobile application program testing method is provided for a terminal. The method includes acquiring a barcode; obtaining a downloading address used for downloading a mobile application program according to the barcode; downloading the mobile application program according to the downloading address; executing the mobile application program; and obtaining a testing instruction for the mobile application program. The mobile application program responds to the testing instruction.

Other aspects of the present disclosure can be understood by those skilled in the art in light of the description, the claims, and the drawings of the present disclosure.

DETAILED DESCRIPTION

To make objectives, technical solutions and advantages of the present disclosure more understandable and comprehensible, the present disclosure is further described in detail below with reference to accompanying drawings and embodiments. It should be understood that the embodiments herein are provided for describing the present disclosure and not intended to limit the present disclosure.

It should be understood that terms such as "first" and "second" used in the present disclosure may be used to describe various elements in this application, but these elements are not limited by these terms. These terms are merely used to differentiate one element with another element. For example, a first terminal may be referred to as a second terminal without departing the scope of the present disclosure. Similarly, the second terminal may be referred to as the first terminal. The first terminal and the second terminal are both terminals, but are not same terminals.

In some embodiments, when testing a mobile application program, the mobile application program needs to be exported to a mobile terminal to test from a computer by using a data bus after completing development to compile the mobile application program in the computer. However, the process of exporting the mobile application program from the computer to the mobile terminal to test is complex to operate, reducing testing efficiency of the mobile application program.

Figure 1:
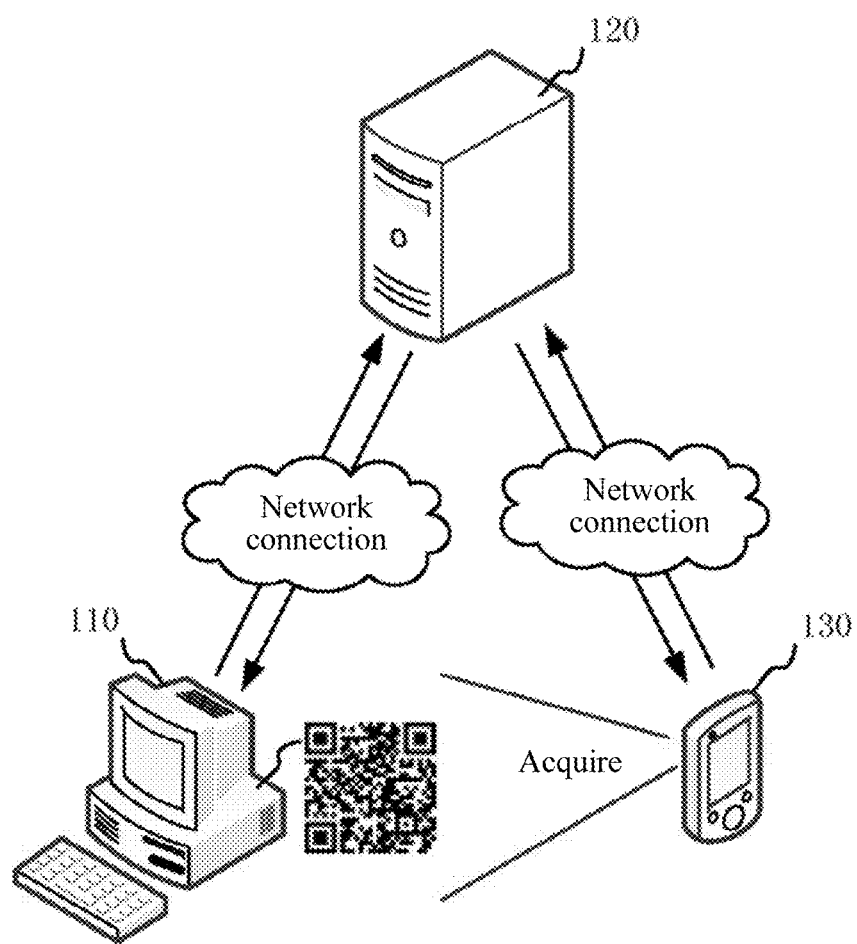
FIG. 1 is an application environment diagram of a mobile application program testing method according to an embodiment of the present disclosure.

To resolve the foregoing technical problem, this application provides a mobile application program testing method. FIG. 1 is an application environment diagram of a mobile application program testing method according to an embodiment of the present disclosure.

Referring to FIG. 1, the mobile application program testing method is applied to a mobile application program testing system. The mobile application program testing system includes a first terminal 110, a server 120, and a second terminal 130. The second terminal 130 is a mobile terminal. The first terminal 110 is configured to edit a code of a mobile application program to implement development of the mobile application program. The first terminal 110 is further configured to detect a testing instruction and send a testing code (or called as a code-to-be-tested) to the server 120 according to the testing instruction.

The server 120 is configured to receive a code-to-be-tested sent by the first terminal 110; compile the code-to-be-tested as a mobile application program; record a downloading address used for downloading the mobile application program; generate a barcode used for obtaining the downloading address; and return the barcode to the first terminal 110. The first terminal 110 may be configured to receive the barcode returned by the server and display the barcode.

The second terminal 130 may be configured to acquire a barcode; obtain a downloading address used for downloading the mobile application program according to the barcode; download the mobile application program according to the downloading address; execute the mobile application program; and obtain a testing instruction for the mobile application program, so that the mobile application program responds to the testing instruction.

Figure 2:
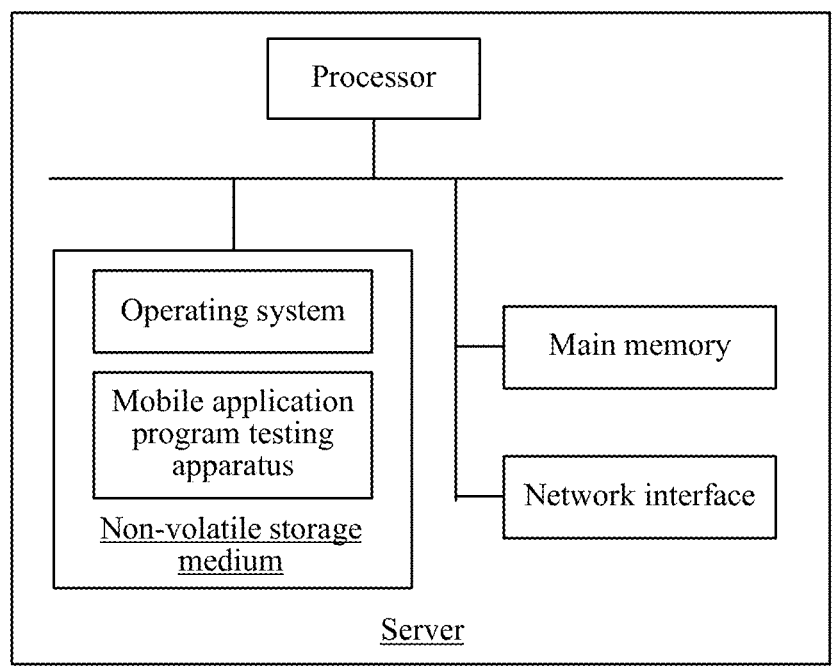
FIG. 2 is a structural block diagram of a server according to an embodiment of the present disclosure.

FIG. 2 is a structural block diagram of a server according to an embodiment of the present disclosure. Referring to FIG. 2, the server includes a processor, a non-volatile storage medium, a main memory, and a network interface that are connected by using a system bus. The non-volatile storage medium of the server stores an operating system and a mobile application program testing apparatus. The mobile application program testing apparatus is configured to implement a mobile application program testing method applicable to the server.

The processor of the server is configured to provide a calculation controllable capability to support operating of the whole server. Specifically, the processor may be configured to: compile a code-to-be-tested as a mobile application program; record a downloading address used for downloading the mobile application program in the non-volatile storage medium and/or the main memory; and generate a barcode used for obtaining the downloading address. The main memory in the server provides an operating environment for a mobile application program testing apparatus in the non-volatile storage medium. The main memory may store a computer readable instruction and when the computer readable instruction is executed by the processor, the processor executes a mobile application program testing method. The network interface of the server is configured to perform network communication with the outside, for example, receiving a testing code or returning a barcode.

The server may be implemented by using an independent server or a server cluster including multiple servers. A person of ordinary skill in the art may understand that a structure shown in FIG. 2 is merely a block diagram of a partial structure related to the solution of this application, and is not limited to the foregoing server in the solution of this application. A specific server may include more or less parts, combination of some parts, or different layouts than what is shown in the figures.

Figure 3A:
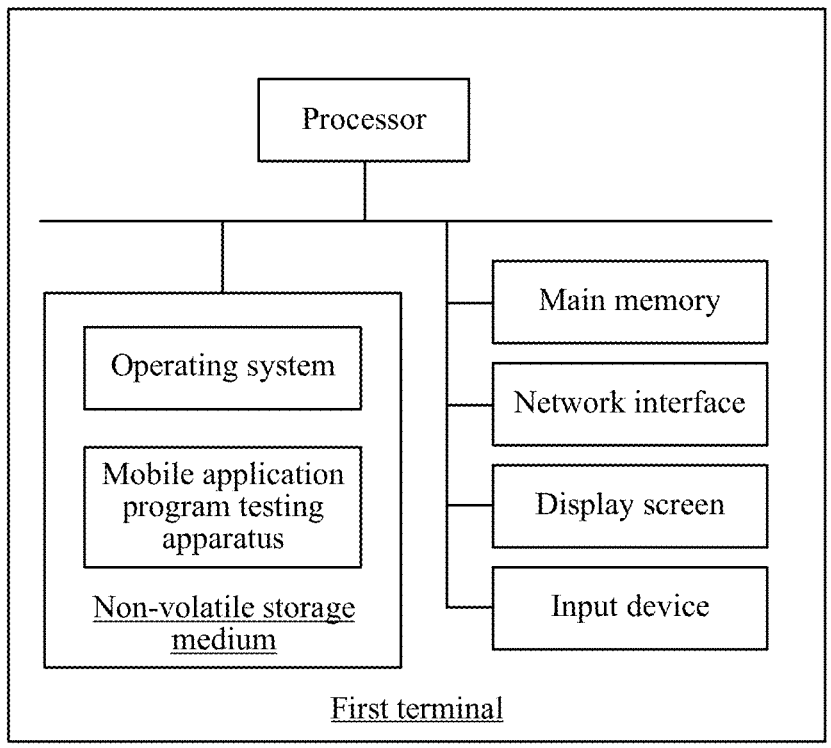
FIG. 3A is a schematic diagram of an internal structure of a first terminal according to an embodiment of the present disclosure.

FIG. 3A is a schematic diagram of an internal structure of a first terminal according to an embodiment of the present disclosure. As shown in FIG. 3A, the first terminal includes a processor, a non-volatile storage medium, a main memory, a network interface, a display screen, and an input device that are connected by using a system bus. The non-volatile storage medium of the first terminal stores an operating system and a mobile application program testing apparatus. The mobile application program testing apparatus is configured to implement a mobile application program testing method. The processor is used to provide a calculating and control capability, and supports running of the entire terminal. The main memory in the first terminal provides an operating environment for a mobile application program testing apparatus in the non-volatile storage medium. The main memory may store a computer readable instruction and when the computer readable instruction is executed by the processor, the processor executes a mobile application program testing method. The network interface is configured to perform network communication with a server, for example, downloading a mobile application program from the server. The display screen of the first terminal may be a liquid crystal display screen or an e-ink display screen or the like. The input device may be a touch layer covering the display screen, or may be a button, a trackball, or a touchpad disposed on a terminal housing, or may be an external keyboard, touchpad, or mouse, or the like. The first terminal may be a personal computer or another device that can be used to develop a mobile application program. Persons skilled in the art may understand that, the structure shown in FIG. 3A is merely a structure partially related to the solutions of this application, and does not constitute a limitation to the terminal to which the solutions of this application are applied, and a specific terminal may include more or fewer components than those shown in the figure, or some components may be combined, or a different component deployment may be used.

Figure 3B:
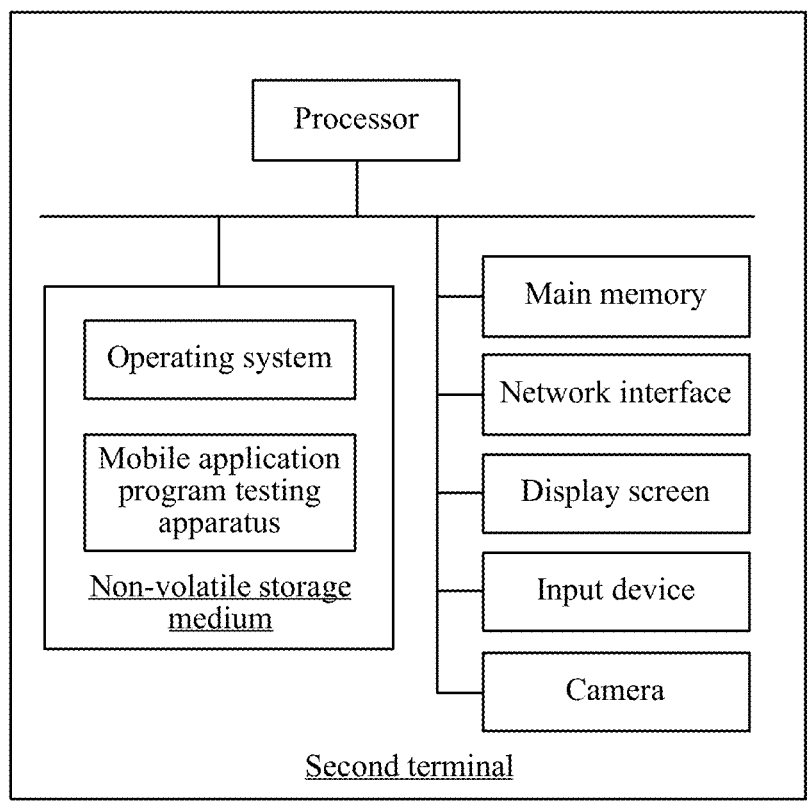
FIG. 3B is a schematic diagram of an internal structure of a second terminal according to an embodiment of the present disclosure.

FIG. 3B is a schematic diagram of an internal structure of a second terminal according to an embodiment of the present disclosure. As shown in FIG. 3B, the second terminal includes a processor, a non-volatile storage medium, a main memory, a network interface, a display screen, an input device, and a camera that are connected by using a system bus. The non-volatile storage medium of the second terminal stores an operating system and a mobile application program testing apparatus. The mobile application program testing apparatus is configured to implement a mobile application program testing method applicable to a mobile terminal. The processor is used to provide a calculating and control capability, and supports running of the entire terminal. The main memory in the second terminal provides an operating environment for a mobile application program testing apparatus in the non-volatile storage medium. The main memory may store a computer readable instruction and when the computer readable instruction is executed by the processor, the processor executes a mobile application program testing method. The network interface is configured to perform network communication with a server, for example, downloading a mobile application program from the server. The display screen of the second terminal may be a liquid crystal display screen or an e-ink display screen or the like. The input device may be a touch layer covering the display screen, or may be a button, a trackball, or a touchpad disposed on a terminal housing, or may be an external keyboard, touchpad, or mouse or the like. The camera is used for acquiring a barcode or the like. The second terminal may be a mobile phone, a tablet computer, a personal digital assistant, a wearable device, or the like. Persons skilled in the art may understand that, the structure shown in FIG. 3B is merely a structure partially related to the solutions of this application, and does not constitute a limitation to the terminal to which the solutions of this application are applied, and a specific terminal may include more or fewer components than those shown in the figure, or some components may be combined, or a different component deployment may be used.

Figure 4:
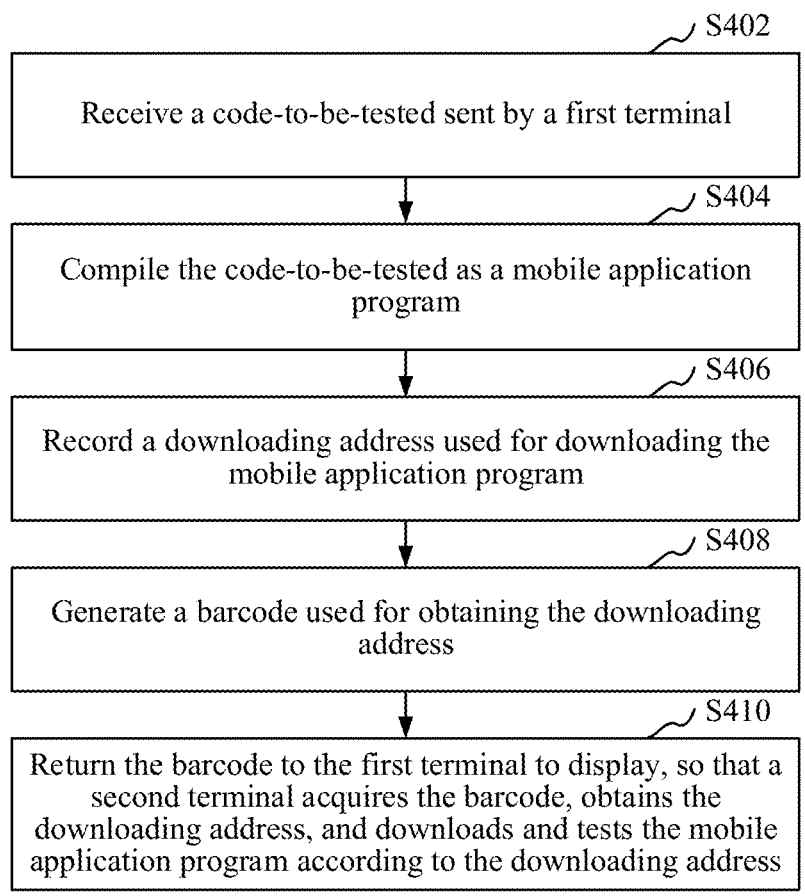
FIG. 4 is a schematic flowchart of a mobile application program testing method according to an embodiment of the present disclosure.

FIG. 4 is a schematic flowchart of a mobile application program testing method according to an embodiment of the present disclosure. This example mainly describes examples by applying the method to the server 120 in FIG. 1. Referring to FIG. 4, the method specifically includes the followings.

S402: Receiving a code-to-be-tested sent by a first terminal.

The first terminal may be a personal computer, running a Windows operating system, a Linux operating system, or a Mac operating system (OS) (Apple desktop operating system). A development program is running on the operating system of the first terminal. The development program is used to develop a mobile application program, mainly used to edit code of the mobile application program, and may further be used to simulate an executing environment of the mobile application program or release the mobile application program. The code-to-be-tested is a code of the mobile application program that needs to be tested and is generally compiled by using an high-level computer language.

In an example, step S402 includes: receiving a code-to-be-tested sent by the first terminal after the first terminal edits the code-to-be-tested by using a development program running on the first terminal. Specifically, the first terminal can generate a development project by using the development program running on the first terminal, and edit various codes needed to develop the mobile application program in the development project. The development program can provide a test-triggering controller. The first terminal detects an operation on the test-triggering controller by using the development program and triggers the testing instruction when detecting the operation on the test-triggering controller. Further, the first terminal uploads all codes needed in the development project when developing the mobile application program to a server as a testing code according to the testing instruction for the server to receive.

S404: Compiling the code-to-be-tested as a mobile application program.

Compiling refers to a process of transferring a high-level computer language as a target code that can be executed. A compiler is a program that transfers the high-level computer language as the target code that can be executed. The compiler can be executed on the server. The server obtains the mobile application program by compiling the code-to-be-tested by the compiler. It may be understood that the mobile application program may further be obtained by using a development program on the first terminal to compile the code-to-be-tested.

S406: Recording a downloading address used for downloading the mobile application program.

Specifically, the downloading address may include a server address, a storage path of the mobile application program on a server, and a name of the mobile application program. The downloading address may merely include the storage path of the mobile application program on the server and the name of the mobile application program. The downloading address may be a uniform resource locator (URL).

S408: Generating a barcode used for obtaining the downloading address.

The bar code is a graph obtained by encoding original characters according to a preset rule and able to restore the original characters. The bar code may include a barcode (further referred to as a 1-dimensional bar code) and a 2-dimensional bar code. The barcode is a graphic identifier that arranges a plurality of black bars and blanks having different widths according to an encoding rule, to express a set of information. A common barcode is a graphic of parallel lines that is formed by black bars (bar for short) and white bars (empty for short) that have significantly different reflectivity. The 2-dimensional bar code is called 2-dimensional code for short, which is a barcode that records, by using a particular geometric figure and according to a rule, data symbol information on back-and-white checkered figures that are distributed in a planar two-dimensional direction.

Generating a barcode used for obtaining the downloading address specifically may be directly encoding the downloading address to obtain the barcode. Generating a barcode used for obtaining the downloading address specifically may be encoding intermediate data used for obtaining the downloading address. The intermediate data may be, for example, a program developer identifier corresponding to the mobile application program, or a program identifier of the mobile application program. The intermediate data may be URL form.

S410: Returning the barcode to the first terminal to be displayed, so that a second terminal acquires the barcode, obtains the downloading address, and downloads and tests the mobile application program according to the downloading address.

Specifically, a server returns the barcode to the first terminal and the first terminal displays the barcode. In an example, S410 includes: returning the barcode to the first terminal for a development program on the first terminal to be displayed.

The second terminal may acquire the barcode displayed by the first terminal, obtains the downloading address used for downloading the mobile application program according to the barcode, and downloads the mobile application program according to the downloading address. The second terminal can provide an executing environment of the mobile application program, so as to execute the mobile application program in the executing environment.

The second terminal obtains the downloading address according to the barcode. Specifically, the second terminal directly parses the barcode to obtain the downloading address. The second terminal obtains the downloading address according to the barcode. After parsing the barcode to obtain intermediate data used for obtaining the downloading address, the second terminal obtains the downloading address according to the intermediate data.

Further, the second terminal tests the executed mobile application program, and specifically obtains a testing instruction for the mobile application program, so that the mobile application program responds to the testing instruction. The testing instruction is an instruction used for testing the mobile application program, for example, an instruction testing a series of functions of the mobile application program, which may be triggered by a user, or be triggered by performing an automatic testing example. The second terminal may further analyze a response of the mobile application program to the testing instruction to obtain a testing report.

The mobile application program testing method includes: when the code-to-be-tested on the first terminal has a testing need, receiving the code-to-be-tested sent by the first terminal; compiling the code-to-be-tested as a mobile application program; recording a downloading address used for downloading the mobile application program; and generating a barcode used for obtaining the downloading address. The second terminal used for testing the mobile application program can acquire the barcode displayed by the first terminal, obtains the downloading address according to the barcode, and downloads and tests the mobile application program. A user of the second terminal merely needs to acquire the barcode by using the second terminal to test the mobile application program. The operation is convenient, thus improving testing efficiency of the mobile application program. In addition, the first terminal does not directly compile the code, thus avoiding that the first terminal adds a malicious code to the mobile application program when compiling.

The server receives a code-to-be-tested sent by the first terminal after the first terminal edits the code-to-be-tested by using a development program running on the first terminal, and returns the barcode to the first terminal to be displayed by the development program running on the first terminal. In this case, in a process that a program developer uses the development program to develop the mobile application program, the program developer can test the mobile application program at any time, thus improving operation convenience of developing the mobile application program.

In an example, S408 includes: generating a barcode according a program developer identifier corresponding to a code-to-be-tested. Step S410 includes: returning the barcode to the first terminal to be displayed, so that the second terminal acquires the barcode and parses the barcode to obtain the program developer identifier; receiving the program developer identifier sent by the second terminal and a user identifier used by the second terminal to log in; and sending the downloading address to the second terminal when the program developer identifier matches the user identifier, so that the second terminal downloads and tests the mobile application program according to the downloading address.

The program developer identifier is used to uniquely identify a program developer. A program developer identifier corresponding to a code-to-be-tested is an only identifier of a program developer of the code-to-be-tested. The program developer compiles the code-to-be-tested to develop a mobile application program on a first terminal by using a development program after using a pre-registered program developer identifier to log in the server. The first terminal can upload the code-to-be-tested and the corresponding program developer identifier to the server. The server directly encodes the program developer identifier to a barcode and returns the barcode to the first terminal to be displayed by the first terminal.

Further, a second terminal acquires a barcode displayed by the first terminal and parses the barcode to obtain the program developer identifier. The second terminal logs in the server by using the user identifier. The second terminal obtains the user identifier used for login and uploads the program developer identifier and the user identifier that are obtained by parsing to the server, so that the server determines whether the program developer identifier matches the user identifier. Whether the program developer identifier matches the user identifier represents whether the program developer identifier opens the testing right to the user identifier. When the program developer identifier matches the user identifier, the program developer identifier opens the testing right to the user identifier. The program developer identifier may have a matching relationship with more than one user identifiers. Therefore, a program developer may open the testing right to more than one testing staffs. The matched program developer identifier and the user identifier may be same. Therefore, a user can be a program developer of a mobile application program as well as testing staff.

Further, the program developer identifier has a correspondence with the downloading address. When the program developer identifier matches the user identifier, the server sends the downloading address corresponding to the program developer identifier to a second terminal. When the downloading address corresponding to the program developer identifier is more than one, the server can select a downloading address having a shortest recording time and send the downloading address to the second terminal.

In this example, the barcode is generated according to the program developer identifier. The second terminal acquires the barcode and parses the barcode to obtain the program developer identifier. Whether the program developer identifier matches the user identifier used by the second terminal to log in may restrain the range of testing staff of the mobile application program, so as to prevent the mobile application program from being leaked before release.

In an example, the mobile application program testing method further includes: receiving a path of a specified page sent by the first terminal. Step S408 includes: generating a barcode used for obtaining the downloading address. Step S410 includes: returning the barcode to the first terminal to be displayed, so that a second terminal acquires the barcode, obtains the path of the specified page and the downloading address, downloads the mobile application program according to the downloading address, and enters the specified page to perform testing according to the path.

The path of the specified page may be configured in a development program and may be uploaded to a server with a code-to-be-tested. The path of the specified page is used to identify a specified page in the mobile application program.

Specifically, when generating the barcode, the server encodes the path of the specified page and the downloading address to obtain the barcode. After acquiring the barcode, the second terminal may directly parse the path of the specified page and the downloading address from the barcode. When generating the barcode, the server may also encode the path of the specified page and intermediate data used for obtaining the downloading address to obtain the barcode. After acquiring the barcode, the second terminal may directly parse the path of the specified page and obtain the downloading address from the server according the parsed intermediate data.

Further, after the second terminal obtains the downloading address, the second terminal downloads the mobile application program according to the downloading address and transmits the path of the specified page to the mobile application program, so that the mobile application program enters the specified page according to the path of the specified page to start testing from the specified page. The second terminal enters the specified page to perform testing according to the path, and specifically obtains a testing instruction for the mobile application program, so that the mobile application program responds to the testing instruction.

For example, a specific page in the mobile application program may be specified according to the barcode, so that the second terminal that acquires the barcode may directly enter the specified page to perform testing, making the test more specific. Further, manually positioning the path is not needed when testing, thereby improving testing efficiency.

In some embodiments, the mobile application program testing method further includes: receiving a program developer identifier and a path of a specified page sent by the first terminal, where the step of generating a barcode used for obtaining the downloading address includes: generating the barcode used for obtaining the downloading address according to the program developer identifier, the path of the specified page, a barcode valid period, and a hash value of the mobile application program; and the step of returning the barcode to the first terminal to be displayed, so that a second terminal acquires the barcode, obtains the downloading address, and downloads and tests the mobile application program according to the downloading address includes: returning the barcode to the first terminal to be displayed, so that a second terminal acquires the barcode and parses the barcode to obtain the program developer identifier, the path of the specified page, the barcode valid period, and the hash value of the mobile application program; receiving a user identifier used by the second terminal to log in that is sent by the second terminal, the program developer identifier, the path of the specified page, the barcode valid period, and the hash value of the mobile application program that are obtained by parsing; sending the downloading address of the mobile application program corresponding to the program developer identifier to the second terminal when the program developer identifier matches the user identifier, a barcode alive period is not longer than the barcode valid period, and the received hash value of the mobile application program is consistent with a current hash value obtained through calculation on the mobile application program; receiving a downloading request initiated by the second terminal according to the downloading address; and returning the mobile application program to the second terminal according to the downloading request, so that the second terminal enters the specified page to perform testing according to the path of the specified page.

In some embodiments, the mobile application program testing method further includes: sending the received hash value of the mobile application program to the second terminal when sending the downloading address of the mobile application program corresponding to the program developer identifier to the second terminal; and returning the mobile application program to the second terminal according to the downloading request, so that when the hash value of the received mobile application program is consistent with the hash value of the downloaded mobile application program calculated by the second terminal, the second terminal enters the specified page according to the path of the specified page to perform testing.

In some embodiments, the mobile application program testing method further includes: sending a testing valid period to the second terminal when sending the downloading address of the mobile application program corresponding to the program developer identifier to the second terminal; and returning the mobile application program to the second terminal according to the downloading request, so that the second terminal enters the specified page to perform testing according to the path of the specified page; and deleting the downloaded mobile application program when an alive period of the mobile application program reaches the testing valid period.

Figure 5:
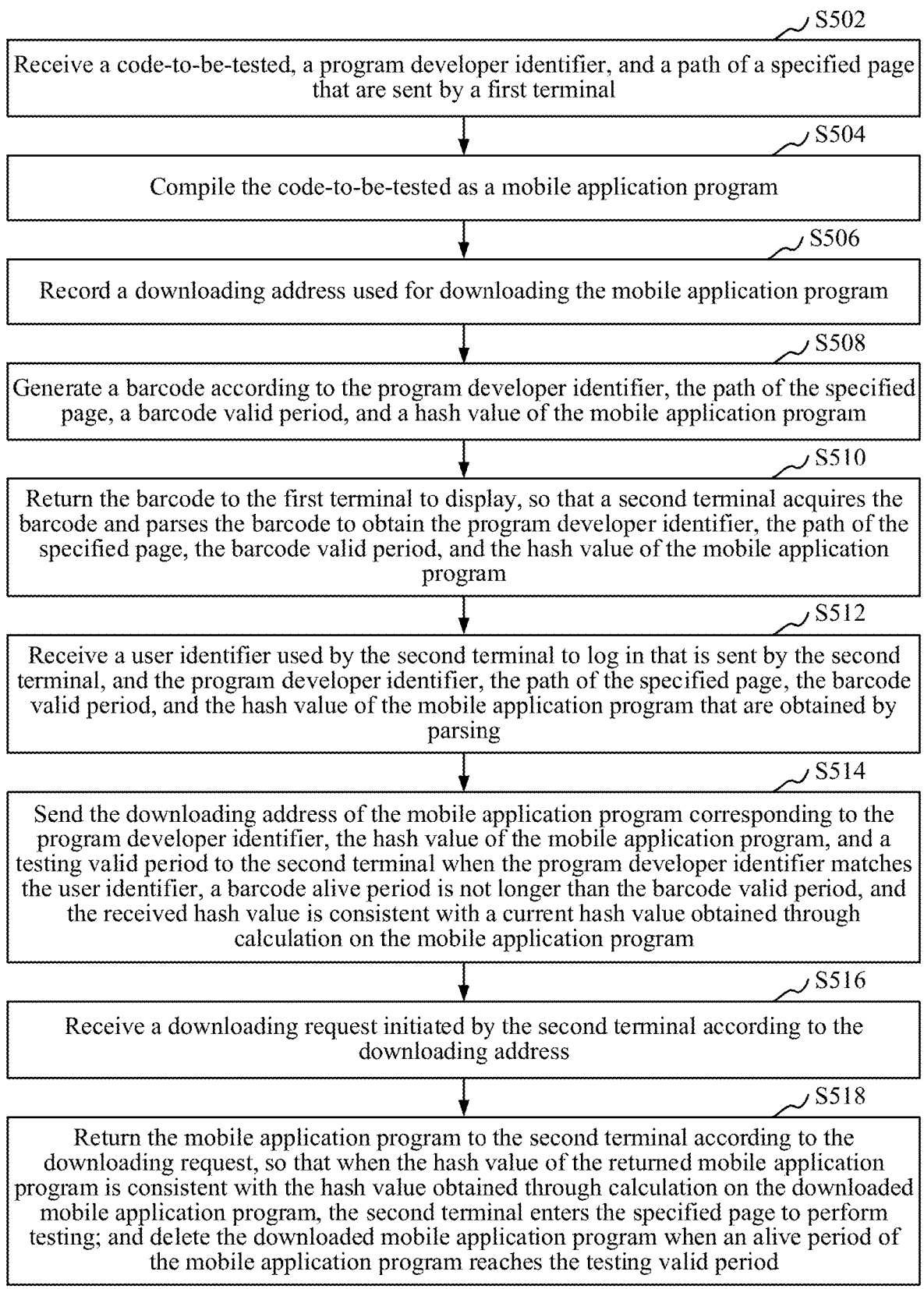
FIG. 5 is a schematic flowchart of a mobile application program testing method according to another example.

As shown in FIG. 5, in an example, a mobile application program testing method is provided. In this example, the method is still applied to the server in FIG. 1 to describe in examples. The method specifically includes the followings.

S502: Receiving a code-to-be-tested, a program developer identifier, and a path of a specified page that are sent by a first terminal.

S504: Compiling the code-to-be-tested as a mobile application program.

S506: Recording a downloading address used for downloading the mobile application program.

S508: Generating a barcode according to the program developer identifier, the path of the specified page, a barcode valid period, and a hash value of the mobile application program.

When generating the barcode, the server can generate the barcode according to the program developer identifier, or generate the barcode according to one or some of combinations of the path of the specified page, the barcode valid period, and the hash value of the mobile application program. The hash value may be referred to as a hash value and may be obtained by using a message digest algorithm 5 (MD5). The barcode valid period may be set according to needs, for example, any value from 30 seconds to 10 minutes may be used, specifically 2 minutes.

Specifically, the server may further carry the program developer identifier, the path of the specified page, the barcode valid period, and the hash value of the mobile application program as parameters in URL used for initiating an access. The URL may access the server and may further include a predefined identifier identifying the URL and used for testing the mobile application program.

S510: Returning the barcode to the first terminal to be displayed, so that a second terminal acquires the barcode and parses the barcode to obtain the program developer identifier, the path of the specified page, the barcode valid period, and the hash value of the mobile application program. Specifically, data obtained by parsing the barcode by the second terminal is consistent with data needed to generate the barcode.

S512: Receiving a user identifier used by the second terminal to log in that is sent by the second terminal, the program developer identifier, the path of the specified page, the barcode valid period, and the hash value of the mobile application program that are obtained by parsing.

S514: Sending the downloading address of the mobile application program corresponding to the program developer identifier, the hash value of the mobile application program, and a testing valid period to the second terminal when the program developer identifier matches the user identifier, a barcode alive period is not longer than the barcode valid period, and the received hash value is consistent with a current hash value obtained through calculation on the mobile application program.

Specifically, the server determines whether the program developer identifier matches the user identifier. If the server receives the barcode valid period, the server further needs to determine whether an alive period of the mobile application program from generation to a current time is longer than the barcode valid period. If the server further receives the hash value of the mobile application program, the server further needs to currently calculate a hash value of the mobile application program on the server and determine whether the received hash value is consistent with a current hash value obtained through calculation on the mobile application program. Authentication is passed when the program developer identifier matches the user identifier, the alive period of the mobile application program from generation to a current time is longer than the barcode valid period, and the received hash value is consistent with a current hash value obtained through calculation on the mobile application program.

S516: Receiving a downloading request initiated by the second terminal according to the downloading address.

S518: Returning the mobile application program to the second terminal according to the downloading request, so that when the hash value of the returned mobile application program is consistent with the hash value obtained through calculation on the downloaded mobile application program, the second terminal enters the specified page to perform testing; and deleting the downloaded mobile application program when an alive period of the mobile application program reaches the testing valid period.

The testing valid period is longer than the barcode valid period. For example, any value from 1 hour to 12 hours may be used, such as 2 hours.

In this example, a user of the second terminal merely needs to acquire the barcode by using the second terminal to test the mobile application program. The operation is convenient, thus improving testing efficiency of the mobile application program. In addition, the first terminal does not directly compile the mobile application program, thus avoiding that the first terminal adds a malicious code to the mobile application program when compiling. The barcode is generated according to the program developer identifier, the path of the specified page, the barcode valid period, and the hash value of the mobile application program, where the program developer identifier, the barcode valid period, and the hash value of the mobile application program may be used for authentication, so as to ensure that the barcode is legal. The hash value of the mobile application program and the testing valid period are sent to the second terminal, so as to further ensure safety of testing.

Figure 6:
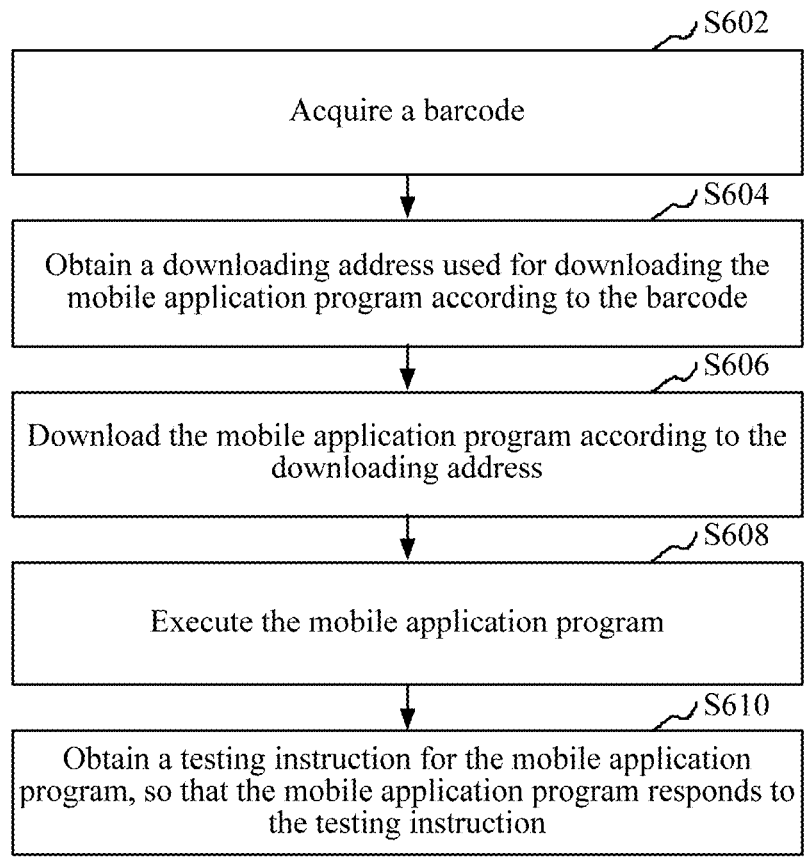
FIG. 6 is a schematic flowchart of a mobile application program testing method according to still another example.

FIG. 6 is a schematic flowchart of a mobile application program testing method according to an embodiment of the present disclosure. This example describes examples by applying the method to the second terminal in FIG. 1. Referring to FIG. 6, the method specifically includes the following steps:

S602: Acquiring a barcode.

Specifically, a first terminal sends a code-to-be-tested to a server. The server compiles the code-to-be-tested as a mobile application program, records a downloading address used for downloading the mobile application program, and generates a barcode used for obtaining the downloading address. The first terminal receives and displays the barcode sent by the server. The second terminal acquires the barcode.

S604: Obtaining a downloading address used for downloading the mobile application program according to the barcode.

The second terminal obtains the downloading address according to the barcode. Specifically, the second terminal directly parses the barcode to obtain the downloading address. The second terminal obtains the downloading address according to the barcode. After parsing the barcode to obtain intermediate data used for obtaining the downloading address, the second terminal obtains the downloading address according to the intermediate data.

S606: Downloading the mobile application program according to the downloading address.

Specifically, the second terminal can initiate a downloading request to a server according to the downloading address and receive the mobile application program sent by the server according to the downloading address.

S608: Executing the mobile application program.

Specifically, the second terminal can provide an executing environment of the mobile application program, so as to execute the mobile application program in the executing environment.

S610: Obtaining a testing instruction for the mobile application program, so that the mobile application program responds to the testing instruction.

The testing instruction is an instruction used for testing the mobile application program, which may be triggered by a user, or be triggered by performing an automatic testing example. The second terminal may further analyze a response of the mobile application program to the testing instruction to obtain a testing report.

The mobile application program testing method downloads the mobile application program by acquiring the barcode, executes the mobile application program, obtains the testing instruction for the mobile application program, so that the mobile application program responds to the testing instruction, thereby completing testing of the mobile application program. A user merely needs to trigger acquiring the barcode by an operation to test the mobile application program. The operation is convenient, thus improving testing efficiency of the mobile application program.

In an example, the mobile application program is obtained and stored by compiling a code-to-be-tested by a server after a terminal uploads the code-to-be-tested to the server by using a development program running on the terminal; and the server records the downloading address used for downloading the mobile application program.

The barcode is generated by the server and sent to the terminal, and is displayed by the terminal by using the development program.

In this example, a code-to-be-tested sent by the first terminal after a development program running on the first terminal compiles the code-to-be-tested is received, and the barcode is returned to the first terminal to be displayed by the development program running on the first terminal. In this case, in a process that a program developer uses the development program to develop the mobile application program, the program developer can test the mobile application program at any time, thus improving operation convenience of developing the mobile application program.

In an example, the mobile application program testing method further includes: obtaining a path of a specified page according to the barcode. After step S608, the mobile application program testing method further includes: transmitting the path of the specified page to the mobile application program, so that the mobile application program enters the specified page.

Specifically, after the second terminal obtains the downloading address, the second terminal downloads the mobile application program according to the downloading address and transmits the path of the specified page to the mobile application program, so that the mobile application program enters the specified page according to the path of the specified page to start testing from the specified page. The second terminal enters the specified page to perform testing according to the path, and specifically obtains a testing instruction for the mobile application program, so that the mobile application program responds to the testing instruction.

In this example, a specific page in the mobile application program may be specified according to the barcode, so that the second terminal that acquires the barcode may directly enter the specified page to perform testing, making the test more specific. Further, manually positioning the path is not needed when testing, thereby improving testing efficiency.

Figure 7:
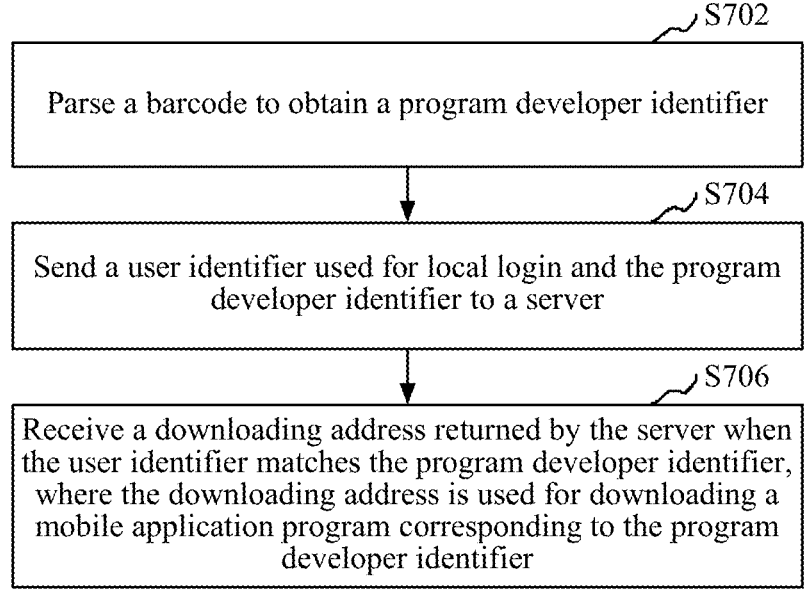
FIG. 7 is a schematic flowchart of obtaining a downloading address used to download a mobile application program according to a barcode according to an embodiment of the present disclosure.

FIG. 7 is a schematic flowchart of step S604 according to an embodiment of the present disclosure. Referring to FIG. 7, the step S604 specifically includes the followings.

S702: Parsing a barcode to obtain a program developer identifier.

The program developer identifier is used to uniquely identify a program developer. A program developer identifier corresponding to a code-to-be-tested is an only identifier of a program developer of the code-to-be-tested. The program developer compiles the code-to-be-tested to develop a mobile application program on a first terminal by using a development program after using a pre-registered program developer identifier to log in a server. The first terminal can upload the code-to-be-tested and the corresponding program developer identifier to the server. The server directly encodes the program developer identifier to a barcode and returns the barcode to the first terminal to be displayed by the first terminal. A second terminal acquires a barcode displayed by the first terminal and parses the barcode to obtain the program developer identifier.

S704: Sending a user identifier used for local login and the program developer identifier to the server.

S706: Receive a downloading address returned by the server when the user identifier matches the program developer identifier, where the downloading address is used for downloading a mobile application program corresponding to the program developer identifier.

Specifically, the second terminal logs in the server by using the user identifier. The second terminal obtains the user identifier used for login and uploads the program developer identifier and the user identifier that are obtained by parsing to the server, so that the server determines whether the program developer identifier matches the user identifier. Whether the program developer identifier matches the user identifier represents that whether the program developer identifier opens a testing right to the user identifier. When the program developer identifier matches the user identifier, the program developer identifier opens the testing right to the user identifier. The program developer identifier may have a matching relationship with more than one user identifier. Therefore, a program developer may open the testing right to more than one testing staff. The matched program developer identifier and the user identifier may be same. Therefore, a user can be a program developer of a mobile application program as well as a testing staff. The mobile application program can be obtained by compiling a code-to-be-tested by a server, or be obtained by compiling a code-to-be-tested by a first terminal by using a development program.

Further, the program developer identifier has a correspondence with the downloading address. When the program developer identifier matches the user identifier, the server sends the downloading address corresponding to the program developer identifier to a second terminal. When the downloading address corresponding to the program developer identifier is more than one, the server can select a downloading address having a shortest recording time and send the downloading address to the second terminal.

In this example, the barcode is generated according to the program developer identifier. The second terminal acquires the barcode and parses the barcode to obtain the program developer identifier. Whether the program developer identifier matches the user identifier used by the second terminal to log in may restrain a range of testing staff of the mobile application program, so as to prevent the mobile application program from being leaked before release.

Figure 8:
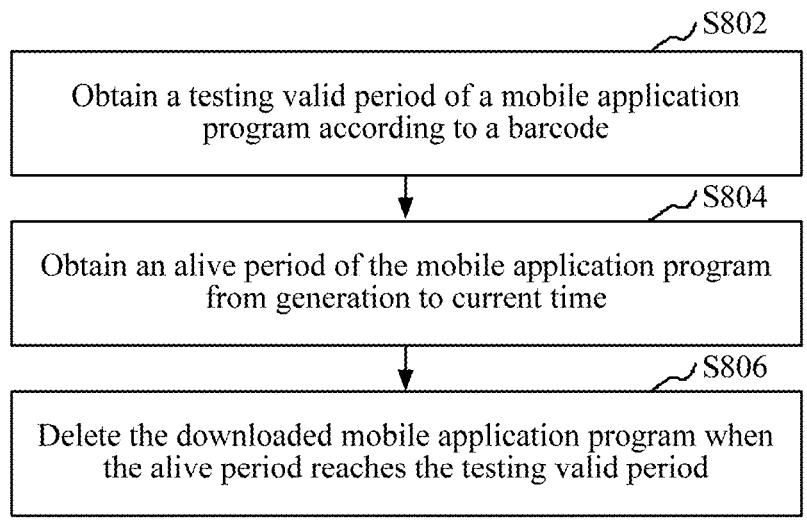
FIG. 8 is a schematic flowchart of deleting a downloaded mobile application program when a teasing period of validity of a mobile application program is out of date according to an embodiment of the present disclosure.

In an example, the mobile application program testing method further includes deleting the downloaded mobile application program when a teasing period of validity of a mobile application program is out of date. Referring to FIG. 8, the process of deleting a downloaded mobile application program when a teasing period of validity of a mobile application program is out of date specifically includes the followings.

S802: Obtaining a testing valid period of the mobile application program according to the barcode.

S804: Obtaining an alive period of the mobile application program from generation to a current time.

S806: Deleting the downloaded mobile application program when the alive period reaches the testing valid period.

The testing valid period represents a valid period that the mobile application program can be tested. If the alive period of the mobile application program from time of generation to a current time reaches the testing valid period, it indicates that the testing valid period allowed by the mobile application program has ended. The downloaded mobile application program is directly deleted and a testing period of the mobile application program is restrained to ensure safety of the mobile application program.

In some embodiments, the step process obtaining a downloading address used for downloading the mobile application program according to the barcode includes: parsing the barcode to obtain a program developer identifier, a path of a specified page, a barcode valid period, and a hash value of the mobile application program; parsing the barcode to obtain a program developer identifier, a path of a specified page, a barcode valid period, and a hash value of the mobile application program; receiving the downloading address sent by the server of the mobile application program corresponding to the program developer identifier when the user identifier matches the program developer identifier, a barcode alive period is not longer than the barcode valid period, and the hash value of the mobile application program is consistent with a hash value of the mobile application program calculated by the server; sending a downloading request initiated according to the downloading address to the server; and receiving the mobile application program returned by the server according to the downloading request; and the step of obtaining a testing instruction for the mobile application program, so that the mobile application program responds to the testing instruction includes: transmitting the path of the specified page to the mobile application program, so that the mobile application program enters the specified page according to the path of the specified page; and obtaining the testing instruction for the mobile application program, so that the mobile application program responds to the testing instruction.

In some embodiments, the mobile application program testing method further includes: receiving the hash value of the mobile application program sent by the server when receiving the downloading address sent by the server of the mobile application program corresponding to the program developer identifier; and receiving the mobile application program returned by the server according to the downloading request; performing the step of transmitting the path of the specified page to the mobile application program when the hash value of the mobile application program is consistent with a current hash value obtained through calculation on the downloaded mobile application program.

In some embodiments, the mobile application program testing method further includes: receiving a testing valid period sent by the server when receiving the downloading address of the mobile application program; and deleting the downloaded mobile application program when an alive period of the mobile application program reaches the testing valid period after transmitting the path of the specified page to the mobile application program.

Figure 9:
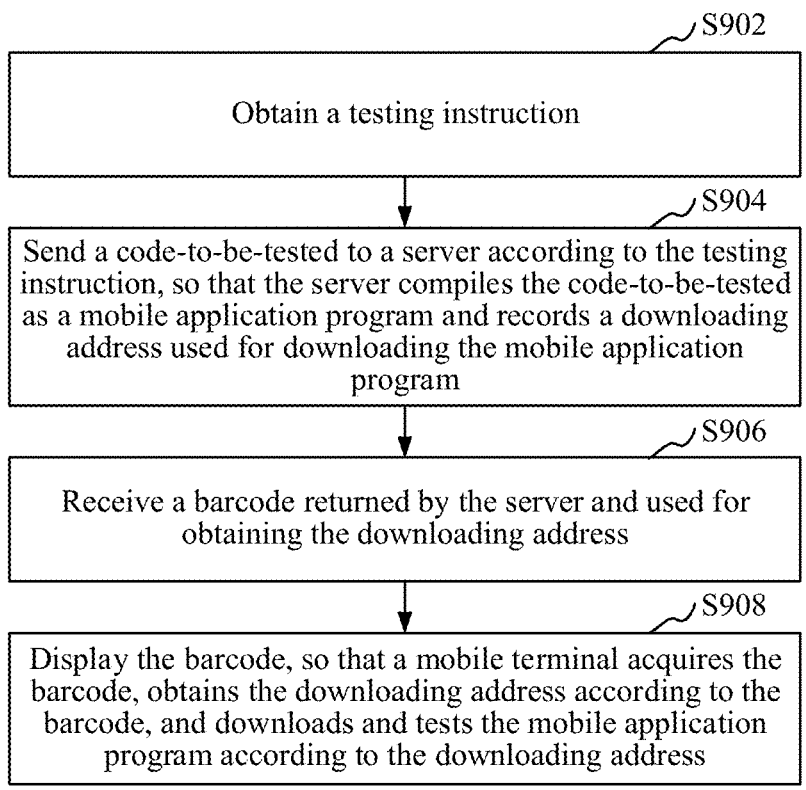
FIG. 9 is a schematic flowchart of a mobile application program testing method according to yet another example.

FIG. 9 is a schematic flowchart of a mobile application program testing method according to an embodiment of the present disclosure. This example describes examples by applying the method to the first terminal in FIG. 1. Referring to FIG. 9, the method specifically includes the followings.

S902: Obtaining a testing instruction.

S904: Sending a code-to-be-tested to a server according to the testing instruction, so that the server compiles the code-to-be-tested as a mobile application program and records a downloading address used for downloading the mobile application program.

S906: Receiving a barcode sent by the server and used for obtaining the downloading address.

S908: Displaying the barcode, so that a mobile terminal acquires the barcode, obtains the downloading address according to the barcode, and downloads and tests the mobile application program according to the downloading address.

In an example, the mobile application program testing method further includes sending a path of a specified page to the server according to the testing instruction, so that the server generates the barcode according to the path of the specified page. Step S908 includes: displaying the barcode, so that the mobile terminal acquires the barcode, obtains the path of the specified page and the downloading address according to the barcode, downloads and tests the mobile application program according to the downloading address, and enters the specified page to perform testing according to the path.

In an example, the mobile application program testing method further includes sending a program developer identifier corresponding to the code-to-be-tested to the server according to the testing instruction, so that the server generates the barcode according to the program developer identifier. Step S908 includes: displaying the barcode, so that the mobile terminal acquires the barcode and parses the barcode to obtain the program developer identifier; sending the program developer identifier and a user identifier used for the mobile terminal to log in to the server; receiving the downloading address sent by the server when the program developer identifier matches the user identifier; and downloading and testing the mobile application program according to the downloading address.

Figure 10:
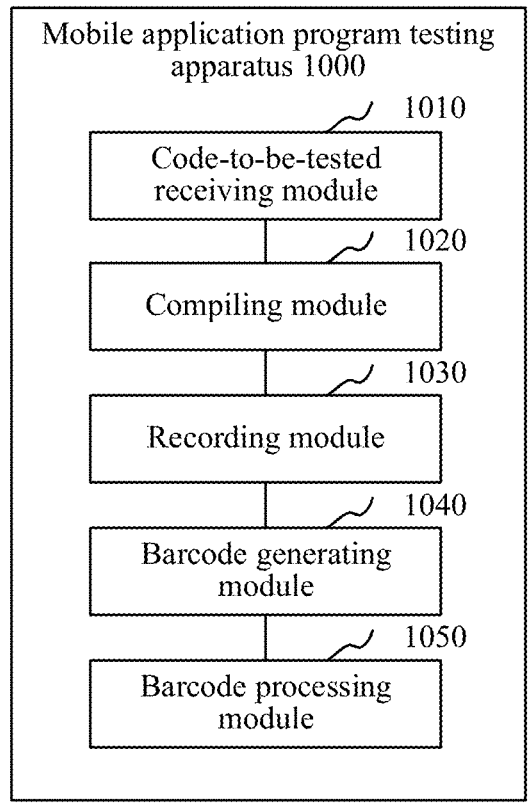
FIG. 10 is a structural block diagram of a mobile application program testing apparatus according to an embodiment of the present disclosure.

FIG. 10 is a structural block diagram of a mobile application program testing apparatus 1000 according to an embodiment of the present disclosure. Referring to FIG. 10, the mobile application program testing apparatus 1000 includes a code-to-be-tested receiving module 1010, a compiling module 1020, a recording module 1030, a barcode generating module 1040, and a barcode processing module 1050.

The code-to-be-tested receiving module 1010 is configured to receive a code-to-be-tested sent by a first terminal.

The compiling module 1020 is configured to compile the code-to-be-tested as a mobile application program.

The recording module 1030 is configured to record a downloading address used for downloading the mobile application program.

The barcode generating module 1040 is configured to generate a barcode used for obtaining the downloading address.

The barcode processing module 1050 is configured to return the barcode to a first terminal to be displayed, so that a second terminal acquires the barcode, obtains the downloading address according to the barcode, and downloads and tests the mobile application program according to the downloading address.

In an example, the barcode generating module 1040 is further configured to generate the barcode according to a program developer identifier corresponding to the code-to-be-tested.

Figure 11:
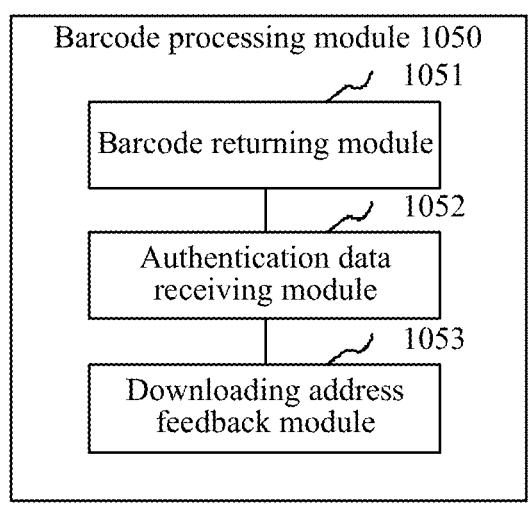
FIG. 11 is a structural block diagram of a barcode processing module in FIG. 10 according to an embodiment of the present disclosure.

As shown in FIG. 11, the barcode processing module 1050 includes a barcode returning module 1051, an authentication data receiving module 1052, and a downloading address feedback module 1053.

The barcode returning module 1051 is configured to return a barcode to a first terminal to be displayed, so that a second terminal acquires the barcode and parses the barcode to obtain a program developer identifier.

The authentication data receiving module 1052 is configured to receive the program developer identifier sent by the second terminal and a user identifier used by the second terminal to log in.

The downloading address feedback module 1053 is configured to send a downloading address to the second terminal when the program developer identifier matches the user identifier, so that the second terminal downloads and tests a mobile application program according to the downloading address.

In this example, the barcode is generated according to the program developer identifier. The second terminal acquires the barcode and parses the barcode to obtain the program developer identifier. Whether the program developer identifier matches the user identifier used by the second terminal to log in may restrain a range of testing staff of the mobile application program, so as to prevent the mobile application program from being leaked before release.

In an example, a code-to-be-tested receiving module 1010 is further configured to receive a code-to-be-tested sent by the first terminal after a development program running on the first terminal compiles the code-to-be-tested.

The barcode processing module 1050 is further configured to return the barcode to the first terminal to be displayed by the development program running on the first terminal.

In this example, a code-to-be-tested sent by the first terminal after a development program running on the first terminal compiles the code-to-be-tested is received, and the barcode is returned to the first terminal to be displayed by the development program running on the first terminal. In this case, in a process that a program developer uses the development program to develop the mobile application program, the program developer can test the mobile application program at any time, thus improving operation convenience of developing the mobile application program.

In an example, a code-to-be-tested receiving module 1010 is further configured to receive a path of a specified page sent by the first terminal.

The barcode generating module 1040 is further configured to generate the barcode used for obtaining the downloading address according to the path of the specified page.

The barcode processing module 1050 is configured to return the barcode to a first terminal to be displayed, so that a second terminal acquires the barcode, obtains the path of the specified page and the downloading address according to the barcode, downloads the mobile application program according to the downloading address, and enters the specified page to perform testing according to the path.

In this example, a specific page in the mobile application program may be specified according to the barcode, so that the second terminal that acquires the barcode may directly enter the specified page to perform testing, making the test more specific. Further, manually positioning the path is not needed when testing, thereby improving testing efficiency.

Figure 12:
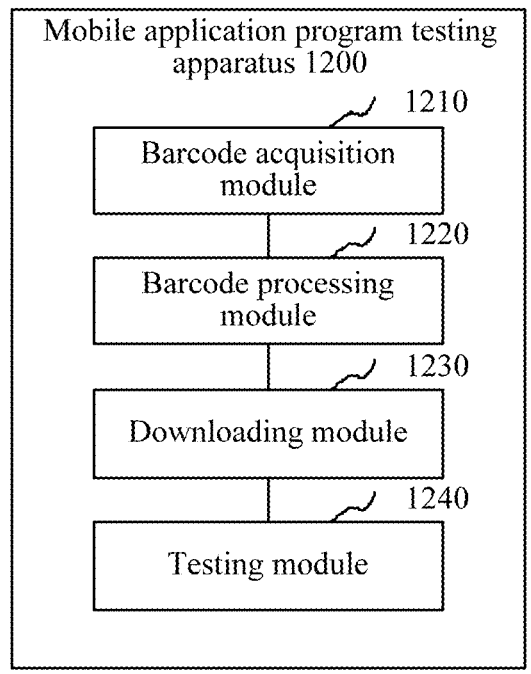
FIG. 12 is a structural block diagram of a mobile application program testing apparatus according to another example.

As shown in FIG. 12, in an example, a mobile application program testing apparatus 1200 is provided, including a barcode acquisition module 1210, a barcode processing module 1220, a downloading module 1230, and a testing module 1240.

The barcode acquisition module 1210 is configured to acquire a barcode.

The barcode processing module 1220 is configured to obtain a downloading address used for downloading a mobile application program according to the barcode.

The downloading module 1230 is configured to download the mobile application program according to the downloading address.

The testing module 1240 is configured to execute the mobile application program. A testing instruction for the mobile application program is obtained, so that the mobile application program responds to the testing instruction.

In an example, the mobile application program is obtained and stored by compiling a code-to-be-tested by a server after a terminal uploads the code-to-be-tested to the server by using a development program running on the terminal; the server records the downloading address used for downloading the mobile application program.

The barcode is generated by the server and sent to the terminal, and is displayed by the terminal by using the development program.

In this example, a code-to-be-tested sent by the first terminal after a development program running on the first terminal compiles the code-to-be-tested is received, and the barcode is returned to the first terminal to be displayed by the development program running on the first terminal. In this case, in a process that a program developer uses the development program to develop the mobile application program, the program developer can test the mobile application program at any time, thus improving operation convenience of developing the mobile application program.

In an example, the barcode processing module 1220 is further configured to obtain a path of a specified page according to the barcode.

The testing module 1240 is further configured to transmit the path of the specified page to the mobile application program after executing the mobile application program, so that the mobile application program enters the specified page.

In this example, a specific page in the mobile application program may be specified according to the barcode, so that the second terminal that acquires the barcode may directly enter the specified page to perform testing, making the test more specific. Further, manually positioning the path is not needed when testing, thereby improving testing efficiency.

In an example, the barcode processing module 1220 is further configured to parse the barcode to obtain a program developer identifier; send a user identifier used for local login and the program developer identifier to a server; and receive a downloading address returned by the server when the user identifier matches the program developer identifier, wherein the downloading address is used for downloading a mobile application program corresponding to the program developer identifier.

In this example, the barcode is generated according to the program developer identifier. The second terminal acquires the barcode and parses the barcode to obtain the program developer identifier. Whether the program developer identifier matches the user identifier used by the second terminal to log in may restrain a range of testing staff of the mobile application program, so as to prevent the mobile application program from being leaked before release.

Figure 13:
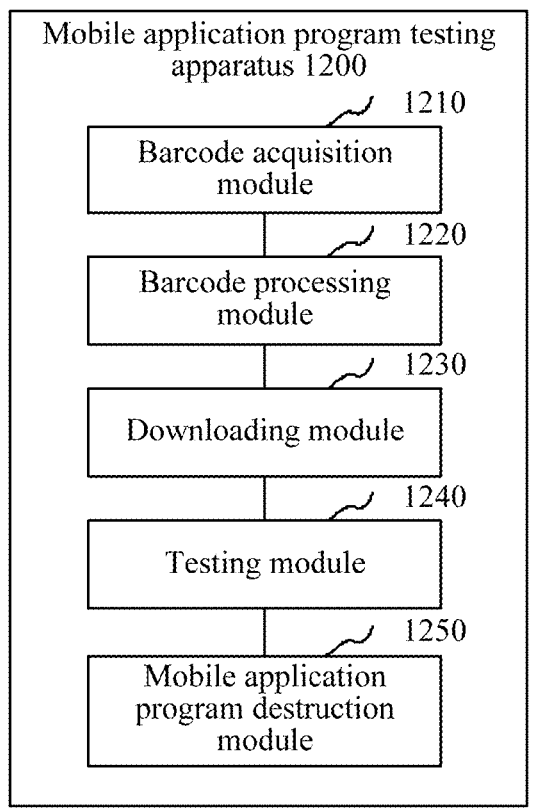
FIG. 13 is a structural block diagram of a mobile application program testing apparatus according to yet another example.

As shown in FIG. 13, in an example, a mobile application program testing apparatus 1200 further includes a mobile application program destruction module 1250, configured to obtain a testing valid period of the mobile application program according to the barcode; obtain an alive period of the mobile application program from generation to a current time; and delete the downloaded mobile application program when the alive period reaches the testing valid period.

The testing valid period represents a valid period that the mobile application program can be tested. If the alive period of the mobile application program from generation to a current time reaches the testing valid period, it is described that the testing valid period allowed by the mobile application program has ended. The downloaded mobile application program is directly deleted and a testing period of the mobile application program is restrained to ensure safety of the mobile application program.

In some embodiments, this application further provides a mobile application program testing apparatus, including: a test-triggering module, configured to obtain a testing instruction; send a code-to-be-tested to a server according to the testing instruction, so that the server compiles the code-to-be-tested as a mobile application program and records a downloading address used for downloading the mobile application program; a barcode receiving module, configured to receive a barcode sent by the server and used for obtaining the downloading address; and a barcode displaying module, configured to display the barcode, so that a second terminal acquires the barcode, obtains the downloading address, and downloads and tests the mobile application program according to the downloading address.

In some embodiments, the test-triggering module is further configured to send a path of a specified page to the server according to the testing instruction, so that the server generates the barcode according to the path of the specified page; and the barcode displaying module is further configured to display the barcode, so that the second terminal acquires the barcode to obtain the path of the specified page and the downloading address; download the mobile application program according to the downloading address; and enter the specified page to perform testing according to the path.

In some embodiments, the test-triggering module is further configured to send a program developer identifier corresponding to the code-to-be-tested to the server according to the testing instruction, so that the server generates the barcode according to the program developer identifier; and the barcode displaying module is further configured to display the barcode, so that the second terminal acquires the barcode and parses the barcode to obtain the program developer identifier; send the program developer identifier and a user identifier used for the mobile terminal to log in to the server; receive the downloading address sent by the server when the program developer identifier matches the user identifier; and download and test the mobile application program according to the downloading address.

Various modules in the foregoing apparatus may be instruction modules. Each instruction module includes a group of instructions. When a processor executes an instruction in an instruction module, a corresponding function of the instruction module may be implemented.

A person of ordinary skill in the art may understand that all or some of the procedures of the methods of the foregoing embodiments may be implemented by a computer program instructing relevant hardware. The program may be stored in a non-volatile computer readable storage medium. When the program is executed, the program may include the procedures of the embodiments of the foregoing methods. The storage medium may be a magnetic disk, an optical disc, a read-only memory (ROM), or the like.

Various technical features in the foregoing embodiments may be combined randomly. For ease of description, possible combinations of various technical features in the foregoing embodiments are not all described. However, the combinations of the technical features should be considered as falling within the scope recorded in this specification provided that the combinations of the technical features are compatible with each other.

The above embodiments only express several implementations of the present disclosure, which are described specifically and in detail, but cannot be construed as a limitation to the patent scope of the present disclosure. It should be noted that, a person of ordinary skill in the art may make various changes and improvements without departing from the ideas of the present disclosure, which shall fall within the protection scope of the present disclosure. Therefore, the protection scope of the present disclosure shall be subject to the claims.

What is claimed is:

1. A mobile application program testing method for a server, comprising:

receiving a code-to-be-tested sent by a first terminal;

receiving a program developer identifier and a path of a specified page sent by the first terminal;

compiling the code-to-be-tested to a mobile application program;

recording a downloading address used for downloading the mobile application program;

generating a barcode used for obtaining the downloading address according to the program developer identifier, the path of the specified page, a barcode valid period, and a hash value of the mobile application program; and returning the barcode to the first terminal to be displayed, so that a second terminal acquires the barcode and parses the barcode to obtain the program developer identifier, the path of the specified page, the barcode valid period, and the hash value of the mobile application program;

receiving, from the second terminal, a user identifier used by the second terminal to log in, and the program developer identifier, the path of the specified page, the barcode valid period, and the hash value of the mobile application program that are obtained by parsing;

sending the downloading address of the mobile application program corresponding to the program developer identifier to the second terminal when the program developer identifier matches the user identifier, a barcode alive period is not longer than the barcode valid period, and the received hash value of the mobile application program is consistent with a current hash value obtained through calculation on the mobile application program;

receiving a downloading request initiated by the second terminal according to the downloading address; and returning the mobile application program to the second terminal according to the downloading request, so that the second terminal enters the specified page to test the mobile application program according to the path of the specified page.

2. The method according to claim 1, wherein:

the receiving a code-to-be-tested sent by a first terminal comprises:

receiving the code-to-be-tested sent by the first terminal after the first terminal edits the code-to-be-tested by using a development program running on the first terminal; and the returning the barcode to the first terminal to be displayed comprises:

returning the barcode to the first terminal to be displayed by the development program running on the first terminal.

3. The method according to claim 1, further comprising:

sending the received hash value of the mobile application program to the second terminal when sending the downloading address of the mobile application program corresponding to the program developer identifier to the second terminal; and returning the mobile application program to the second terminal according to the downloading request, so that when the received hash value of the mobile application program is consistent with the hash value of the downloaded mobile application program calculated by the second terminal, the second terminal enters the specified page to perform testing according to the path of the specified page.

4. The method according to claim 1, further comprising:

sending a testing valid period to the second terminal when sending the downloading address of the mobile application program corresponding to the program developer identifier to the second terminal; and returning the mobile application program to the second terminal according to the downloading request, so that the second terminal enters the specified page to perform testing according to the path of the specified page; and deleting the downloaded mobile application program when an alive period of the mobile application program reaches the testing valid period.

5. A mobile application program testing method for a terminal, comprising:
- acquiring a barcode;
- parsing the barcode to obtain a program developer identifier, a path of a specified page, a barcode valid period, and a hash value of the mobile application program;
- sending a user identifier used for local login, the program developer identifier, the barcode valid period, and the hash value of the mobile application program to a server;
- receiving the downloading address of the mobile application program corresponding to the program developer identifier sent by the server when the user identifier matches the program developer identifier, a barcode alive period is not longer than the barcode valid period, and the hash value of the mobile application program is consistent with a hash value of the mobile application program calculated by the server;
- sending a downloading request initiated according to the downloading address to the server;
- receiving the mobile application program returned by the server according to the downloading request;
- executing the mobile application program; and
- obtaining a testing instruction for the mobile application program, so that the mobile application program responds to the testing instruction.

6. The method according to claim 5, wherein the mobile application program is obtained and stored by compiling a code-to-be-tested by a server after another terminal uploads the code-to-be-tested to the server by using a development program running on the another terminal; the server records the downloading address used for downloading the mobile application program; and
- the barcode is generated and sent to the another terminal by the server, and is displayed by the another terminal by using the development program.

7. The method according to claim 5, further comprising:
- obtaining a testing valid period of the mobile application program according to the barcode;
- obtaining an alive period of the mobile application program from time of generation to a current time; and
- deleting the downloaded mobile application program when the alive period reaches the testing valid period.

8. The method according to claim 5, wherein the obtaining a testing instruction for the mobile application program, so that the mobile application program responds to the testing instruction comprises:
- transmitting the path of the specified page to the mobile application program, so that the mobile application program enters the specified page according to the path of the specified page; and obtaining the testing instruction for the mobile application program, so that the mobile application program responds to the testing instruction.

9. The method according to claim 8, wherein:
the method further comprises:
- receiving the hash value of the mobile application program sent by the server when receiving the downloading address of the mobile application program corresponding to the program developer identifier sent by the server; and
- receiving the mobile application program returned by the server according to the downloading request; and
the transmitting the path of the specified page to the mobile application program comprises:
- transmitting the path of the specified page to the mobile application program when the hash value of the mobile application program is consistent with a current hash value obtained through calculation on the downloaded mobile application program.

10. The method according to claim 5, further comprising:
- receiving a testing valid period sent by the server when receiving the downloading address of the mobile application program; and
- deleting the downloaded mobile application program when an alive period of the mobile application program reaches the testing valid period after transmitting the path of the specified page to the mobile application program.

11. A terminal for mobile application program testing, comprising: a memory; and a processor coupled to the memory and configured to:
- acquire a barcode;
- parse the barcode to obtain a program developer identifier, a path of a specified page, a barcode valid period, and a hash value of the mobile application program;
- send a user identifier used for local login, the program developer identifier, the barcode valid period, and the hash value of the mobile application program to a server;
- receive the downloading address of the mobile application program corresponding to the program developer identifier sent by the server when the user identifier matches the program developer identifier, a barcode alive period is not longer than the barcode valid period, and the hash value of the mobile application program is consistent with a hash value of the mobile application program calculated by the server;
- send a downloading request initiated according to the downloading address to the server;
- receive the mobile application program returned by the server according to the downloading request;
- execute the mobile application program; and
- obtain a testing instruction for the mobile application program, so that the mobile application program responds to the testing instruction.

12. The terminal according to claim 11, wherein the mobile application program is obtained and stored by compiling a code-to-be-tested by a server after another terminal uploads the code-to-be-tested to the server by using a development program running on the another terminal; the server records the downloading address used for downloading the mobile application program; and
- the barcode is generated and sent to the another terminal by the server, and is displayed by the another terminal by using the development program.

13. The terminal according to claim 11, wherein the processor is further configured to:
- obtain a testing valid period of the mobile application program according to the barcode;
- obtain an alive period of the mobile application program from time of generation to a current time; and
- delete the downloaded mobile application program when the alive period reaches the testing valid period.

14. The terminal according to claim 11, wherein the processor is further configured to:
- transmit the path of the specified page to the mobile application program, so that the mobile application program enters the specified page according to the path of the specified page; and
- obtain the testing instruction for the mobile application program, so that the mobile application program responds to the testing instruction.

15. The terminal according to claim 14, wherein the processor is further configured to:
- receive the hash value of the mobile application program sent by the server when receiving the downloading address of the mobile application program corresponding to the program developer identifier sent by the server; and
- receive the mobile application program returned by the server according to the downloading request; and
- transmit the path of the specified page to the mobile application program when the hash value of the mobile application program is consistent with a current hash value obtained through calculation on the downloaded mobile application program.

16. The terminal according to claim 11, wherein the processor is further configured to:
- receive a testing valid period sent by the server when receiving the downloading address of the mobile application program; and
- delete the downloaded mobile application program when an alive period of the mobile application program reaches the testing valid period after transmitting the path of the specified page to the mobile application program.

\* \* \* \* \*